Figure 1:
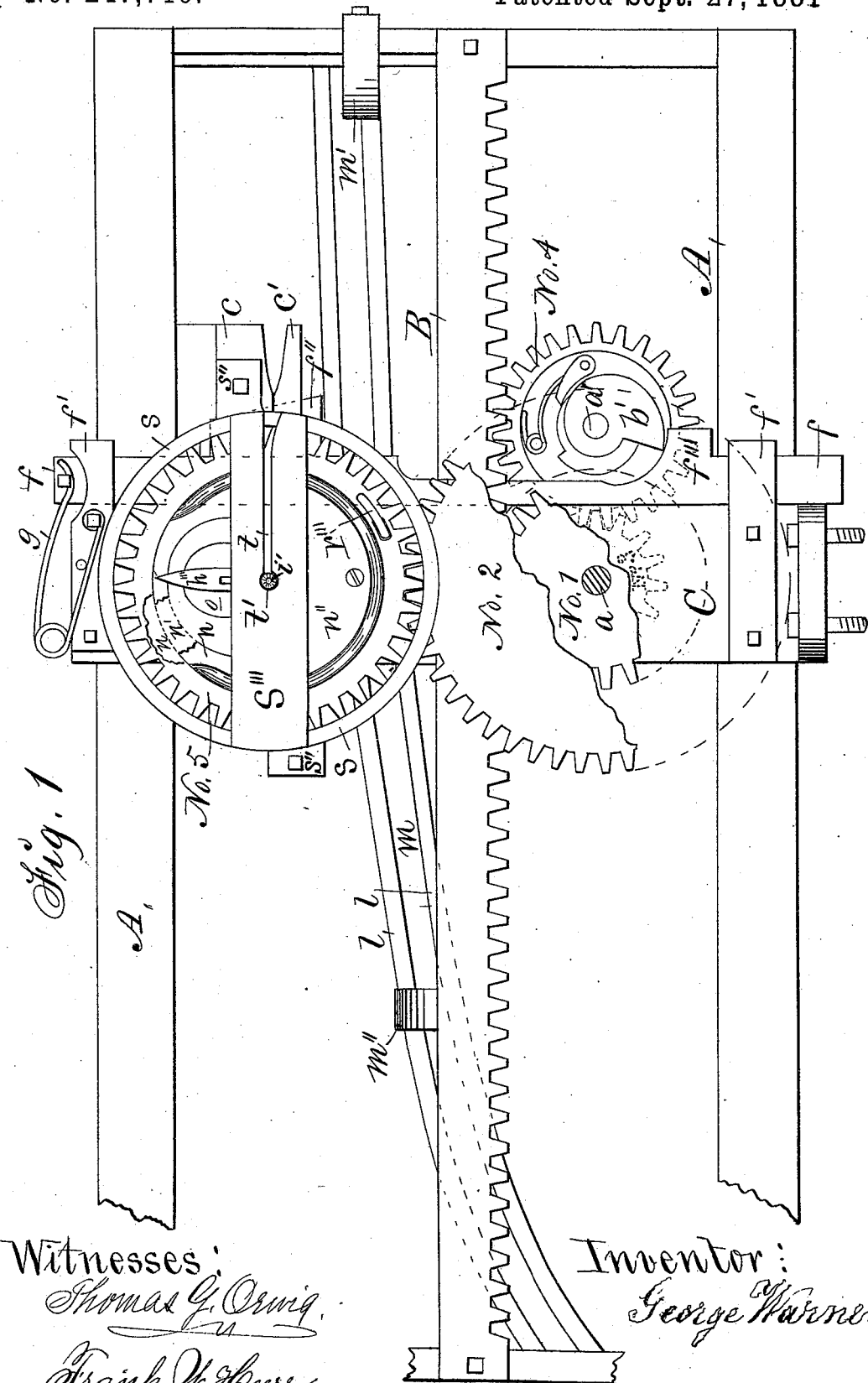

(Model.)

G. WARNER.
GRAIN BINDER.

No. 247,719. Patented Sept. 27, 1881.

Witnesses:
Thomas G. Orwig.
Frank W. Heers.

Inventor:
George Warner

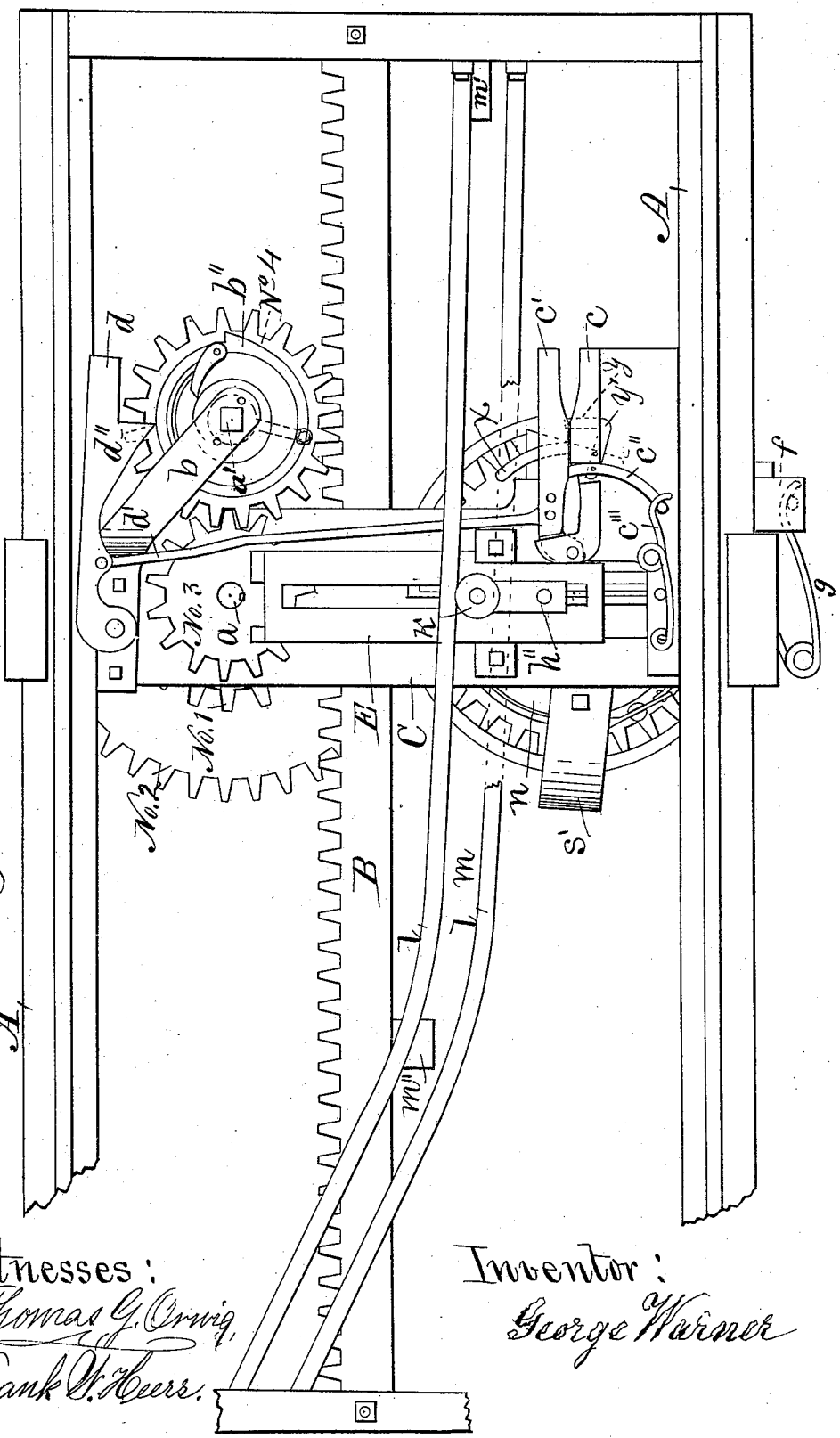

(Model.)
4 Sheets—Sheet 3.
G. WARNER.
GRAIN BINDER.
No. 247,719.  Patented Sept. 27, 1881.
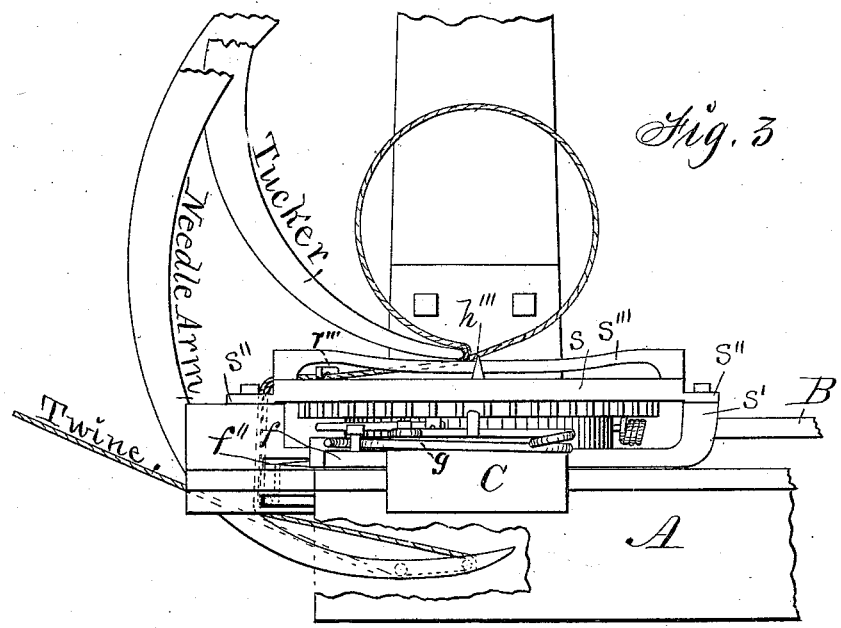
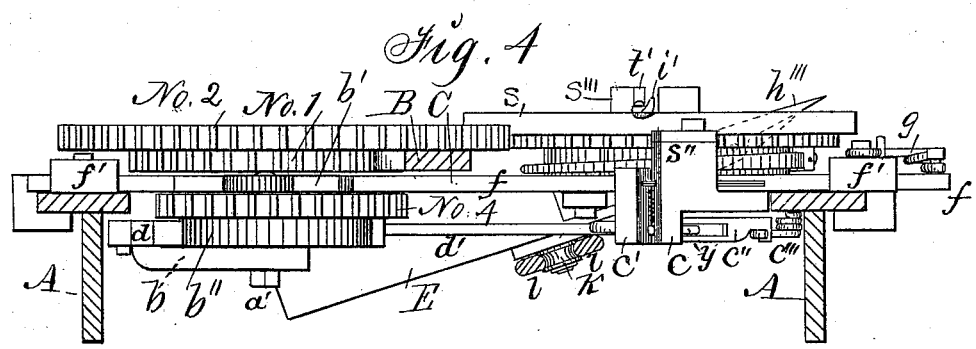
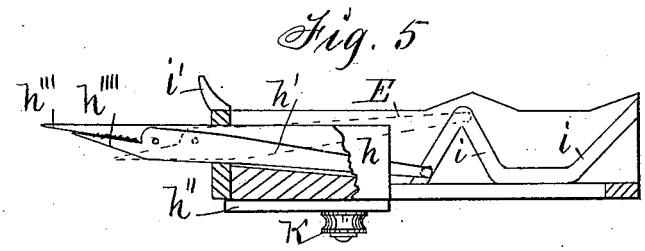
Witnesses:
Thomas G. Orwig,
Frank W. Heers.
Inventor:
George Warner (Model.)
4 Sheets—Sheet 4.
G. WARNER.
GRAIN BINDER.
No. 247,719.
Patented Sept. 27, 1881.
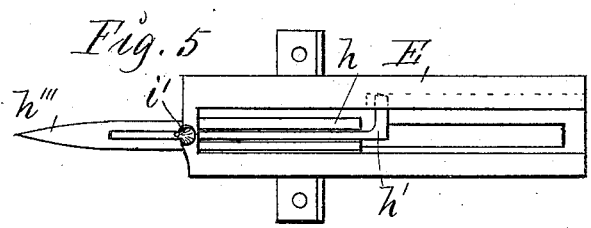
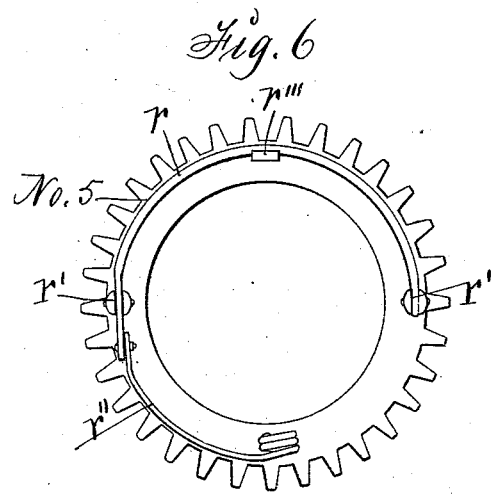
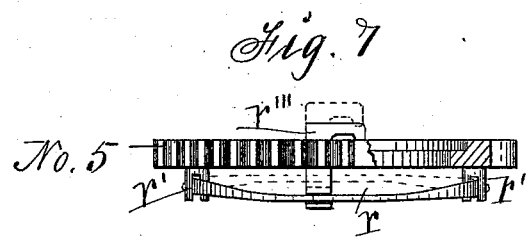
Witnesses:
Thomas G. Orwig,
Frank W. Heers.
Inventor:
George Warner

UNITED STATES PATENT OFFICE.

GEORGE WARNER, OF DES MOINES, IOWA, ASSIGNOR OF ONE-FOURTH TO H. S. BUTLER, OF SAME PLACE.

GRAIN-BINDER.

SPECIFICATION forming part of Letters Patent No. 247,719, dated September 27, 1881.

Application filed January 26, 1881. (Model.)

*To all whom it may concern:*

Be it known that I, GEORGE WARNER, of Des Moines, in the county of Polk and State of Iowa, have invented an Improved Knot-Tying Mechanism for Grain-Binders, of which the following is a specification.

The object of my invention is to facilitate the operation of automatically binding grain on a reaper as rapidly as it is cut by means of bands successively taken from a continuous twine and passed around gavels and then cut off and their ends securely fastened together by tying over-hand knots in the parallel ends. It consists in twine-holding, twine-carrying, twine-cutting, and knot-tying mechanisms constructed and combined, as hereinafter set forth, to form an attachment adapted to harvesters having a reciprocating binder-carriage such as that shown in Patent No. 201,149, issued March 12, 1878; also in Patent No. 215,704 of May 20, 1879.

Figure 1 of my accompanying drawings is a top-plan view of my improvement adapted to be attached to a harvester. Fig. 2 is a view of the under side of the same, or Fig. 1 inverted. Fig. 3 is an end view of my attachment, showing its position relative to the needle-arm or twine-carrier and the twine-tucker when the twine has been carried around a gavel and the parallel ends thereof are ready to be knotted together. Fig. 4 is a transverse section of my attachment resting upon the side bars of the binder-frame. Fig. 5 is a longitudinal sectional view of my knot-tyer. Figs. 6 and 7 are detail views of parts of the twine-carrying and knot-tying mechanism. These figures clearly illustrate the construction, application, and operation of my complete invention.

A A represent the binder-frame.

B is a rack spanned across the top of the frame A near its center, and fixed to its ends in an elevated position.

C is the frame or base upon which my several operating devices are mounted and carried. It consists of a straight flat bar adapted to be bolted to the reciprocating binder-carriage by means of an elbow at its end. It is designed to extend across the frame A, under the rack B, and to slide upon the side bars of the binder-frame. Suitable flanges or bearings may be formed on or attached to the ends of this moving base C to facilitate its movements and to relieve it from any undue binding and straining.

No. 1 is a drive-wheel fixed to a vertical shaft, $a$, that has its bearing in the base C in such a position relative to the rack B that it will allow the rack to engage and rotate the wheel as the reciprocating binder-carriage carries the attachment backward and forward on the binder-frame.

No. 2 is a gear-wheel fixed on the shaft $a$ and above the wheel No. 1 in such a manner that they will rotate together. By means of this wheel No. 2 motion is transmitted from the rack B through the drive-wheel No. 1 to a gear-wheel, No. 5, of suitable size to operate my knot-tying device.

No. 3 is a pinion fixed on the lower end of the shaft $a$ to operate my twine-holding and twine-cutting devices.

$b$ (shown plainly in Fig. 2) is a bent bar or bracket fixed to the under side of the base-piece C to extend laterally to form a step or support and bearing for a shaft, $a'$, upon which is mounted a loose gear-wheel, No. 4, placed between two cams fixed to the shaft $a'$.

$b'$ (shown in Fig. 1) is a cam fixed to the upper end of the shaft $a'$ to operate my twine-cutter.

$b''$ (shown in Fig. 2) is a cam fixed on the lower end of the shaft $a'$ to operate my twine-holder.

A pawl carried by the loose gear-wheel No. 4 on its upper face engages a ratchet formed on or fixed to the cam $b'$ to lock the wheel, the shaft, and the cam together, as required, to cause them to rotate together at proper intervals for the purpose of actuating my twine-holder and twine-cutter.

$c$ is a stationary jaw, fixed to the under side of the base C by means of screws. It has a serrated face, designed to let the twine pass over it upward, but to prevent it from passing downward.

$c'$ is a corresponding jaw hinged to a knuckle on the rear end of the fixed jaw, as shown in Fig. 2.

$c''$ is a hook projecting laterally from the face of the hinged jaw $c'$ through an opening in the face of the fixed jaw $c$, to connect with a spring, $c'''$, that is attached to the under side of the fixed jaw $c$. By means of this connection the spring will hold the hinged jaw firmly closed upon the fixed jaw, as required, to clamp the twine and hold it while a sheaf is being bound.

$d$ is a lever pivoted to the under side of the frame C, at the opposite end from the jaws $c\,c'$, and connected with the hinged jaw $c'$ by means of a rod, $d'$, that is connected with the jaw $c'$ at different points, as required, to open the jaw to accommodate twine of different sizes. $d''$ is a cam on the inside face of the lever $d$, that is engaged by the cam $b''$ on the shaft $a'$ at each revolution of that cam, and the lever $d$ is thereby moved outward sufficiently to pull the jaw $c'$ open at regular intervals, as required, to release the twine.

A pawl carried on the under side of the cam $b''$ engages a ratchet that is fixed to the upper face of the step $b$ to retain the cam $b''$ stationary at intervals while the gear-wheel No. 4 travels rearward on the rack B.

$f$ (shown in Fig. 1) is a sliding knife-carrier, in the shape of a bar, that extends along the side of the base C, and is supported in bearings $f'$, attached to the ends of the same base.

$f''$ is a tapering knife, detachably connected with the carrier $f$ in such a position relative to the jaws $c$ and $c'$ that it will move horizontally back and forth through slots in said jaws to make draw-cuts at regular intervals to cut off the twine after it has been passed around a gavel. Motion is imparted to the knife-carrier by means of the cam $b'$ on the shaft $a'$, and a corresponding cam, $f'''$, on the carrier, to draw the knife away from the twine. A sudden reverse movement of the carrier $f$ to cut the twine is caused by the force of a spring, $g$, attached to one of the bearings $f'$ at each revolution of the cam $b'$, and at the same instant that the cams $b'$ and $f'''$ become disengaged.

E (shown in Figs. 2, 4, and 5) is a detachable case, formed in such a manner that it can be readily fastened, by means of ears projecting laterally from its sides, to the frame C in an inclined position, to allow its upper end to extend through a corresponding slot formed in the frame C.

$h$ is a block fitted to slide in the front portion of the case E. It has a longitudinal slot in its upper portion, within which the shank $h'$ of a pivoted jaw is operated. It also has a rib on its under side, that projects downward through a corresponding slot in the bottom of the case.

$h''$ is a plate, fixed to the rib of the sliding block by means of screws, and serves to retain the sliding block in its bearings.

$h'''$ is a jaw formed on or rigidly fixed to the front end and upper portion of the block $h$.

$h''''$ is a corresponding jaw pivoted in the bifurcated rear portion of the fixed jaw. It has a shank, $h'$, extending rearward through the slotted block, and at the rear end the shank is bent at right angles, to form a pin that will extend into a cam-groove, $i\,i$, that is formed in the inside face of the case E. The jaws thus placed within the case resemble in shape the beak of a bird. The upper one extends forward beyond the lower one. Serrations or teeth at the rear ends of the jaws aid in holding the end of the twine securely while a knot is being tied.

$i'$ is a pointed projection on the end and center of the case. Its function is explained hereinafter.

$k$ is an anti-friction roller attached to the lower side of the plate $h''$ and the sliding block $h$, to perform the function, in connection with a cam-groove, of imparting motion to the sliding block. It projects downward through a cam-groove that extends from one end of the binder-frame to the other.

$l\,l$ (shown in Figs. 1, 2, and 4) are two parallel rods, rigidly fixed to the ends of the binder-frame in such a manner that the space between them forms an inclined and curved groove, $m$, within which the roller $k$ travels as my complete attachment moves back and forth on the binder-frame at regular intervals.

$n$ (shown in Fig. 1) is a circular platform or boss rising from the upper surface of the base-piece C. It may be formed integral therewith, or rigidly attached thereto, in any suitable way. It has an annular shoulder, $n'$, that forms a bearing for the gear-wheel No. 5, that is designed to engage the gear-wheel, No. 2, on the shaft $a$, and is secured to its bearing by means of a washer-plate, $n''$, that fits in a corresponding depression in the upper surface of the rim of the wheel. The plate $n''$ is fixed to the circular boss $n$ by means of screws, in such a manner that it will allow the wheel No. 5 to revolve upon the boss.

$o$ is an opening in the platform or boss $n$, that allows the tying-jaws $h'''\,h''''$ to project through upward, to allow the ends of the twine to be engaged thereby. The plate $n''$, fixed on the top of the boss, has a corresponding opening.

$r$ (shown in Figs. 6 and 7) is a semicircular lever pivoted to bearers $r'$, that project downward from the under side of the wheel No. 5.

$r''$ is a spring, fixed to the same wheel in such a position relative to the lever $r$ that it can be flexibly connected with the short arm of the lever $r$, to keep the short arm closed against the wheel.

$r'''$ is a hook that extends down through a slot in the wheel No. 5, and is connected with the extremity of the long arm of the semicircular lever $r$, which is operated by means of the spring $r''$ and wedge-shaped cams $m'$ and $m''$ in the line of the cam-groove $m$, as shown in Figs. 1 and 2. The cam $m'$ is fixed to the binder-frame, and the cam $m''$ to the rack B.

$s$ is a circular fender (shown in Figs. 1, 3, and 4) that surrounds the gear-wheel No. 5, and serves to keep the twine from coming in contact with the wheel, and also to direct and carry the ends of the twine relative to the tying-jaws $h'''$ and $h''''$. This fender $s$ is secured to the top of the fixed jaw c, and to a brace, s', extending from the frame C, by means of screws passed through ears s'', that project laterally from opposite sides of the fender s.

s''' is a bridge-plate, fixed to the top and opposite sides of the circular fender s in a right-angled position relative to the tying-jaws h''' h''''. It has a slot, t, that extends from the side near the jaws c c' to its center, where it terminates in a round opening, t', through which the pointed projection i' on the case E projects upward to engage the twine and serve as a pivotal point, while the wheel No. 5 revolves, and, by means of the hook r''', carries the ends of the band around the tying-jaws that move in and out of the case E while the wheel is revolving. To carry the ends of the band around the pivotal point i they must first be brought together by means of the needle-arm and the tucker, as shown in Fig. 3. The hook r''', projecting up through the wheel No. 5, will then be raised by means of the cam m' to admit and clamp the parallel and united ends of the band as it passes under the slotted end of the bridge s''' and draws them around the closed jaws h''' h'''' while it makes one revolution, and until released by means of cam m'' after carrying the united ends between the jaws. When a loop is thus formed in the parallel ends of the band, the tying-jaws within the loop are opened by means of the cam-groove i i in the side of the case E, and the end of the shank of the lower jaw that terminates in said cam-groove to admit and seize the parallel ends of the twine as the wheel commences a second revolution. When the ends are clamped together in the jaws, the jaws recede until they have passed beyond the pivotal point i' and allowed the loop to slip therefrom to be drawn together tightly upon the parallel ends carried through the loop by means of the receding jaws. After the knot is thus tied the jaws are opened to release the ends of the band by means of the rear and inwardly-inclined portion of the cam-groove i i. The alternate advancing and receding motions of the jaws h''' h'''' are occasioned by the inclined cam-groove m, and the roller k, that traverses it during the reciprocating movements of the complete attachment and the binder-carriage relative to the stationary binder-frame A.

x (shown in Fig. 2) is a pin that projects from the fixed jaw c through a corresponding perforation in the hinged jaw c' to restrict the passage of the twine rearward between the jaws.

y is a pin projecting through a mortise in the fixed jaw c to form a point around which the twine is turned upward as the needle-arm rises to carry the twine around a gavel. It is formed integral with and carried by an elbow-shaped lever, y', that is pivoted to the jaw and connected with the hook c'', carried by the hinged jaw c', to move in and out of the jaw c at proper intervals.

In the operation of my invention thus constructed and applied to a reaper it is necessary to have the end of the twine that extends from a spool through the eye of the needle-arm properly clamped fast in the jaws c c' before the reaper is put in motion. This I can readily do regardless of the position of my attachment relative to the binder-frame on which it moves by simply seizing the end of the twine projecting through the needle-arm and drawing it upward between the jaws c and c', and then turning the drive-shaft a' (by means of a crank or wrench attached or applied to its lower square end, as shown in Fig. 2) to revolve the cams b' and b'' to operate the jaws to open and seize the twine and to operate the cutter f f'' to cut off the superfluous part of the twine. When the twine is thus placed in the jaws the attachment is ready to act in concert with the reaper. When the binder-carriage and my attachment are at the rear end of the binder frame the needle-arm will be raised, and as the binder-frame and attachment moves forward the twine will be placed around a gavel as the needle-arm descends, to bring the two ends of the band together in the jaws c c'. When the band is thus drawn around the gavel the tucker-arm, moving in concert with the needle-arm, pushes the parallel ends of the band above the jaws to the pivotal point i' in the center of the wheel No. 5, and holds them there as the attachment commences its rearward motion to actuate my knot-tying devices. As the wheel No. 5 is revolved the hook r''' draws the end of the twine from the jaws c c', and also draws the continuous twine from the spool through the needle-arm to be clamped in the jaws before the band is cut off, as hereinbefore set forth, to complete the binding of the sheaf. Every time my attachment is moved from the rear to the front of the binder-frame and then back again the complete binding mechanism will bind a sheaf, and all the grain cut will be thus automatically bound as the reaper advances.

I claim as my invention—

1. The shaft a', having the cam b'', that carries a pawl to engage a ratchet fixed to the shaft-bearing b, the loose gear-wheel No. 4, carrying a pawl to engage a ratchet fixed to the shaft a', and the pinion No. 3, fixed to the drive-shaft a, arranged and combined substantially as and for the purpose shown and described.

2. The combination of the lever d, having a cam, d'', the cam b'' on the shaft a', the hinged jaw c', and the adjustable rod d', substantially as and for the purpose shown and described.

3. The combination of the fixed jaw c, the hinged jaw c', having the projecting hook c'', and the spring c''', substantially as and for the purpose shown and described.

4. The pin x, fixed to the jaw c, in combination with the hinged jaw c', for the purpose of restricting the movement of the twine between the jaws, as and for the purpose set forth.

5. The combined pin and lever y y', pivoted to the jaw c, in combination with the hook c'', carried by the jaw $c'$, for the purpose of doubling the twine in the manner set forth.

6. The drive-shaft $a$, having the pinion No. 3, the shaft $a'$, the gear-wheel No. 4, the cam $b''$, the lever and cam $d\ d''$, the adjustable rod $d'$, the fixed jaw $c$, the hinged jaw $c'$, having the hook $c''$, and the spring $c'''$, arranged and combined substantially as and for the purpose shown and described.

7. The combination of the sliding bar $f$, carrying the knife $f''$, and having the cam $f'''$, the cam $b'$ on the shaft $a'$, and the spring $g$, substantially as and for the purpose set forth.

8. The frame C, the driving-shaft $a$, the gear-wheel No. 2, the boss $n\ n'$, the gear-wheel No. 5, the twine-carrying hook, and the knot-tying jaws, with their operating mechanism, the whole arranged and combined to operate in the manner set forth.

9. The wheel No. 5, in combination with the lever $r$, spring $r'''$, hook $r''$, and knot-tying jaws, as and for the purpose set forth.

10. The fixed circular fender $s$, the bridge-plate $s'''$, having opening $t\ t'$, the twine-holding jaws $c\ c'$, the wheel No. 5, carrying the twine holding and carrying devices $r\ r''\ r'''$, and the tying-jaws $h'''\ h''''$, arranged and combined substantially as and for the purpose shown and described.

11. The combination of the sliding frame C, the wheel No. 5, carrying the twine-holding device $r\ r''\ r'''$, the cam $m'$, fixed to the frame A, and the cam $m''$, fixed to the rack B, substantially as and for the purpose set forth.

12. The case E, having the cam-groove $i\ i$, the sliding block $h\ h''$, having the fixed jaw $h'''$ at its front end, and the pivoted jaw $h''''$, having the shank $h'$, which terminates in an arm projecting at right angles to fit and move in the cam $i\ i$, the whole constructed and combined substantially as and for the purpose shown and described.

13. The fixed frame A and the sliding frame C, in combination with the case E, the knot-tying jaws, the anti-friction roller $k$, and the inclined cam-groove $m$, substantially as and for the purpose shown and described.

14. The frame C, having the boss $n$, provided with the opening $o$, the wheel No. 5, carrying the twine-clamping hook $r'''$, the circular fender $s$, the bridge-plate $s'''$, having the opening $t\ t'$, the projection $i$, and the knot-tying jaws, arranged and combined substantially as and for the purpose shown and described.

15. The knot-tying attachment for grain-binders consisting of the fixed frame A, having the rack B, the cam-groove $m$, the cams $m'\ m''$, the sliding frame C, having the boss $n$, provided with opening $o$, the drive-shaft $a$, having wheels 1, 2, and 3, the shaft $a'$, having cams $b'\ b''$ and loose wheel 4, the twine-holding devices $c\ c'\ c''\ c'''\ d\ d'\ d''$, the twine-governing devices $x\ y\ y'$, the twine-cutting device $f\ f'\ f''\ g$, the case E, having knot-tying mechanism $h\ h''\ h'''\ h''''$, $i\ i\ i'$, and $k$, the wheel 5, having twine clamping and carrying devices $r\ r''\ r'''$, the fender $s$, the bridge $s'''$, having opening $t\ t'$ and intermediate operating mechanism, arranged and combined substantially as shown and described.

GEORGE WARNER.

Witnesses:
H. S. BUTLER,
R. G. ORWIG.